United States Patent

Beretta

[15] 3,666,208

[45] May 30, 1972

[54] AUTOMATIC TAPE TRANSDUCER MECHANISM

[72] Inventor: Alessandro Beretta, 16, Piazza Insubria 20137, Milano, Italy

[22] Filed: Mar. 18, 1970

[21] Appl. No.: 20,557

[30] Foreign Application Priority Data

Mar. 24, 1969 Italy ................................14480 A/69

[52] U.S. Cl. ..........................................242/198, 274/11 C

[51] Int. Cl.........................................G03b 1/04, G11b 5/00

[58] Field of Search..................242/193, 194, 197, 198, 199, 242/200; 274/4 B, 4 C, 11 B, 11 C

[56] References Cited

UNITED STATES PATENTS

| | | | |
|---|---|---|---|
| 3,540,738 | 11/1970 | Yamamoto et al. | 274/4 |
| 2,914,620 | 11/1959 | Dale | 242/199 X |
| 3,385,534 | 5/1968 | Staar | 242/198 |
| 3,429,519 | 2/1969 | Staar | 242/200 |
| 3,433,428 | 3/1969 | Schatteman | 242/198 X |
| 3,475,031 | 10/1969 | Kuehnlein | 274/4 |
| 3,514,050 | 5/1970 | Yamamoto et al. | 242/198 |

*Primary Examiner*—Stanley N. Gilreath
*Assistant Examiner*—Werner H. Schroeder
*Attorney*—Michael S. Striker

[57] ABSTRACT

A tape transducer using a replaceable cartridge including a tape and two reels between which the tape is transferred upon tape drive provided by reel driving pins and capstan. The mechanism comprises an oscillatable plate carrying the pins and the capstan and the motor and transmission means for driving same, and various slide components, arm means and latching devices for causing engagement and activation of the transducer upon pushing the cartridge into the apparatus and for causing return of the transducer to fully deactivated condition and pushing out of the cartridge when complete unwinding of the tape from either reel is sensed.

7 Claims, 13 Drawing Figures

INVENTOR.
ALESSANDRO BERETTA

BY Michael S. Striker
Attorney

INVENTOR.
ALESSANDRO BERETTA

BY

Attorney

INVENTOR
ALESSANDRO BERETTA
BY [signature]
Attorney

INVENTOR.
ALESSANDRO BEROTTA
BY Michael I. Striker
Attorney

AUTOMATIC TAPE TRANSDUCER MECHANISM

BACKGROUND OF THE INVENTION

This invention relates to tape recording apparatus of the type adapted to receive tape cartridges each including a pair of reels built into an outer casing. Particularly, this invention is concerned with a new and improved tape recorder of the type comprising an apparatus casing provided with an elongated opening in one of its minor faces, wherethrough a standard cartridge can be slid for preparing the apparatus for operation, either for recording or for playing-back, for reproducing music or speech.

Such cartridge operated tape recorders are widely known and on demand. These devices are portable, small sized and easy to be operated and handled by unskilled persons. Generally, such devices comprise several mechanisms for ensuring a more or less complete automatic operation. Storage battery supplied and portable tape recorders of the above kind, adapted for outdoor use, for use during train and car travels and so on, are more fully automatized.

The apparatuses of the type considered above are necessarily provided with a plurality of rather complicated mechanisms for providing the several actions and actuations. These mechanisms require further interlock means to prevent uncompatible actions, such as anticipated movements and so on. For example, the motions by which the reel driving pins are engaged within the cartridge must be performed only upon proper positioning of same cartridge. The motions which provide the engagement of the reel drive pins and tape drive capstan (all those parts and motions are well known in the art) in the cartridge are performed in a direction perpendicular to the major faces of the cartridge casing, while the motion by which the transducer head is engaged with the tape in the cartridge, through a suitable cutout provided on a longer side of the cartridge casing, is performed in a direction parallel to the said major faces and perpendicular to said longer side. Therefore, such motions, perpendicular to each others, require further complicated actuators and guide means.

SUMMARY OF THE INVENTION

It is therefore a principal object of this invention to provide a fully automatic tape recorder wherein mechanisms are provided to promote complete activation of the device upon simple pushing a cartridge into the apparatus, said pushing action triggering a sequence of operations comprising: (a) fitting of reel driving pins within hub holes in the reels enclosed in the cartridge and positioning of a tape driving capstan on the back of the tape running between said reels within said cartridge, (b) engaging the tape with the transducer head and with a tape follower adapted to signal complete unwinding of the tape from one reel, and (c) causing a pinch roller to frictionally engage said capstan, whereby the device is ready for operation either in view of recording or for reproducing, said mechanisms comprising means designed for having the said sequence automatically reversed and the said operations promoted by the sensing of complete unwinding of the tape from one reel.

A further object of the invention is to provide a new and improved tape recorder mechanism including spring means connected to movable components for biasing same in direction opposite to that of the motions caused by manual pushing the cartridge into the apparatus, latch means for locking said components at the positions reached upon said pushing action, and either operator controlled or automatic de-latching means for unlocking said components and triggering the reverse sequence of action for completely deactivating the apparatus and at least partially pushing the cartridge out therefrom.

A still further object of the invention is to provide a mechanism as above, including locking means so as to lock the several movable components in either their operative or not operative positions, the unlocking of said means being promoted upon performarce of preceeding actions in the said sequence, to prevent anticipated and/or incompatible motions and actions in the activation and deactivation of the device.

Substantially, the new device comprises a stationary plate whereon a cartridge can be manually slid into the apparatus until engagement with spring biased means, a movable plate pivotally supported beneath said stationary plate and supporting the reels driving pins and the tape driving capstan, together with the motor and transmission means for driving said pins and capstan, means for swinging-up said movable plate for fitting said pins and capstan from below within the cartridge and then for causing the tape to engage the transducer head and the sensing tape follower, and finally for locking the above components in their engaged relationship in view of activation of the recorder.

These and other objects of the invention will be best apparent from the following detailed description of a preferred embodiment of the invention, shown in the accompanying drawings, wherein the structural components and the devices, not forming part of the invention (such as the apparatus casing, the various electric and electronic components and the supply thereof) have been omitted. The said drawings form an essential components of this disclosure.

Figures 1, 2:
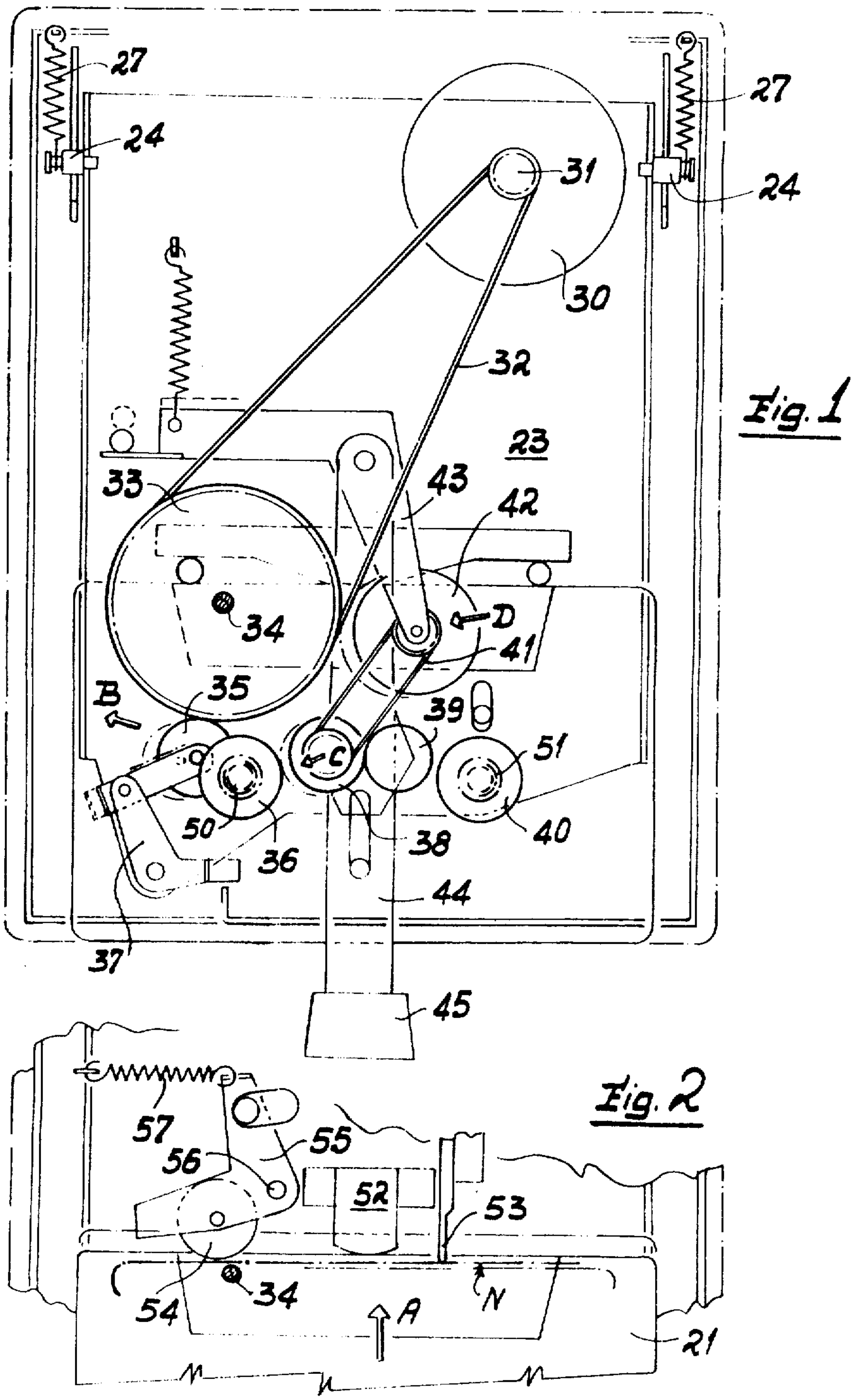
FIG. 1 is a somewhat simplified plan view of the pins and capstan driving means, supported by the movable plate.
FIG. 2 is a fragmentary similar plan view of the tape engaging components, supported by the stationary plate.

In consideration of the fact that the apparatus of the invention comprises several mechanisms individually designed to perform different actions and operations, in the above listed several FIGURES said mechanisms have been at a certain extent individually shown, that is in certain FIGURES the greatest part of the components of one given mechanism have been shown, while the components of other adjacent and also superimposed mechanisms have been omitted for preventing masking of the essential members of the given mechanisms being discussed. In addition, certain parts have been illustrated in phantom lines, where actually concealed by other parts in the views of the drawings.

DETAILED DESCRIPTION OF THE PREFERRED EMBODIMENT

For better understanding of the invention, the parts and means which are generally common to apparatuses of the kind above indicated, will be briefly described. As shown in FIGS. 3, 4, 8 and 9, the recording apparatus comprises a stationary plate 20 on which a standard made flat cartridge 21 can be manually slid within the apparatus casing (not shown) in direction A (FIGS. 2, 3 and 5), side guides 22 (FIGS. 3 and 4) being provided for ensuring the proper fitting of the cartridge in position, where in the cartridge a capstan 34 to frictionally drive the tape, pressed thereagainst by a pinch roller 54, and reel driving pins 50 and 51 can be engaged. An essentially straight leg N of the tape, running between the two reels (not shown) in the cartridge 21, is also engaged with a transducer head 52, for recording or reproducing.

According to the invention, the drive mechanism provided for driving said pins 50, 51 and capstan 34, is supported on a movable plate 23, pivotally connected by pins 24 engaged in lugs 25 (FIGS. 5, 6 and 8) integral with said plate 23, and rotatable and slidable in elongated holes provided in lugs 26 integral with the stationary plate 20. Springs 27 (FIGS. 1 and 8) urge the said movable plate 23 in the direction A, whereby said plate and the means carried thereby can perform an oscillatory motion, about the axis of pins 24, and a short linear motion, parallel to stationary plate 20.

Figures 8, 9:
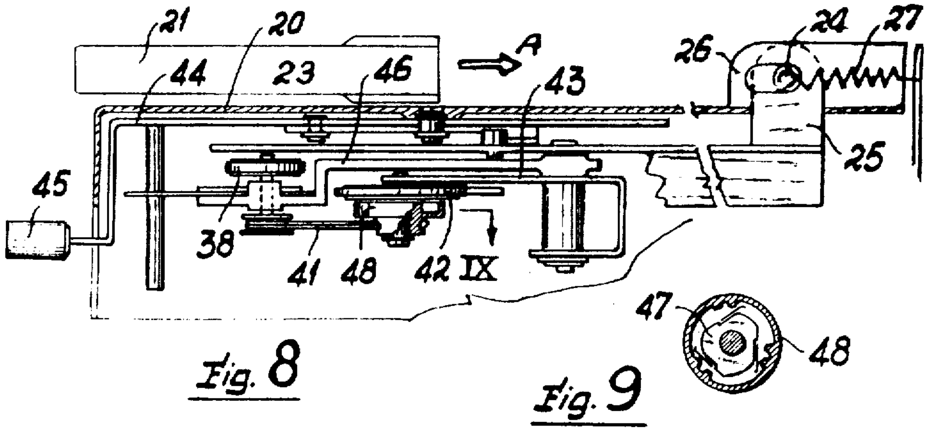
FIG. 8 is a fragmentary side view of the movable plate together with the drive mechanism of FIG. 1.
FIG. 9 is a detail of the drive mechanism, shown in sectional view taken in the plane indicated at IX in FIG. 8.

The motor and transmission means are shown in FIGS. 1 and 8. Such means comprise a motor 30 having a driving pulley 31 which drives a transmission belt 32 for rotating a driven pulley and flywheel 33 having the said capstan 34 co-axially secured thereto. The inertial mass of flywheel 33 ensures uniform motion of the tape and is also used for the purposes described below. As known in the art, the capstan operates during the recording and reproducing operations.

During regular recording or reproducing, the flywheel frictionally engages a pulley 35 having a shaft forming a capstan which drives the pulley 36 which has the pin 50 co-axially connected therewith. The said pin 50 drives the wind-up reel. During re-winding, pulley 35, carried by a lever 37, is moved in direction B to disengage its capstan from pulley 36. Same disengagement occurs when fast motion of the tape towards the wind-up reel is desired; in such occurrence, another pulley 38 is moved in direction C into frictional engagement with pulley 36, said pulley 38 being driven by a small belt 41 and a larger pulley 42 carried by an arm 43 and urged in direction D into frictional engagement with flywheel 33.

For reversing the motion of the tape (re-winding), the pulley 38, driven as above, urges an intermediate pulley 39 into a frictional engagement with the pulley 40 which has the other reel driving pin 51 co-axially secured thereto. As shown in FIGS. 8 and 9, the drive of said small belt 41 is made through a ratchet gear comprising parts 47 and 48. In FIG. 8 is also seen a brace 46 which carries the said pulley 38 for leftward and rightward movement thereof, said movements being caused by the operator by conventionally acting on the knob 45 of a control lever 44.

The above drive mechanism, which is generally conventional and which can be modified by those skilled in the art, does not form part of the invention (and therefore will not more detailedly described), except as its mounting on the movable and hingedly secured plate 23.

Figure 10:
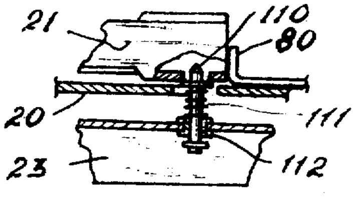
FIG. 10 is a fragmentary sectional view of an auxiliary device designed for positioning the cartridge in operation relatively to the movable plate.

When the said capstan 34 and pins 50 and 51 are engaged within the cartridge 21, this cartridge must be kept in exact place. To prevent side loads on such rotating members, the positioning of the cartridge is secured by pins 110 (FIG. 10) upwardly spring urged by springs 111 and slidably carried in small bushings 112 secured to said movable plate 23.

The fore position of movable plate 23, together with the cartridge engaged by the above described components 34, 50, 51 and 111 carried by same plate, within the amplitude resulting by the length of the said elongated holes of lugs 26, is provided for engaging the tape N, through cutouts conventionally provided along one longer side of the cartridge casing, with the transducer head 52 (FIGS. 2 and 5) and with a tape follower or tape tension sensor 53 (FIGS. 2, 3, 4, 7, 11 and 12), for activating the recording apparatus. Through another conventionally arranged cutout, a rubber made or coated pinch roller 54 (FIGS. 2,3,4 and 6) is urged against the tape N, in front of the drive capstan 34, for ensuring its frictional engagement with said capstan.

Said pinch roller 54 is rotatably supported by a L-shaped lever 55 pivotally secured at 56 to the stationary plate 20, and a spring 57 provided for the pressure to be exerted by said pinch roller 54 on the tape against the drive capstan 34. When the apparatus is not activated, the said pinch roller 54 is kept spaced from the tape by an oscillating lever 97 (FIGS. 3, 4 and 6) having an upturned lug 98 at one of its ends, which prevents the pinch roller carrying lever 55 to be moved in direction F until the movable plate 23, having been fully upwardly oscillated in direction E (FIG. 6), upwardly urges the opposite end portion 99 of said oscillating lever, Therefore, the urging of said pinch roller 54 against the tape N is also triggered by the upward swinging motion of said movable plate 23.

Figure 3:
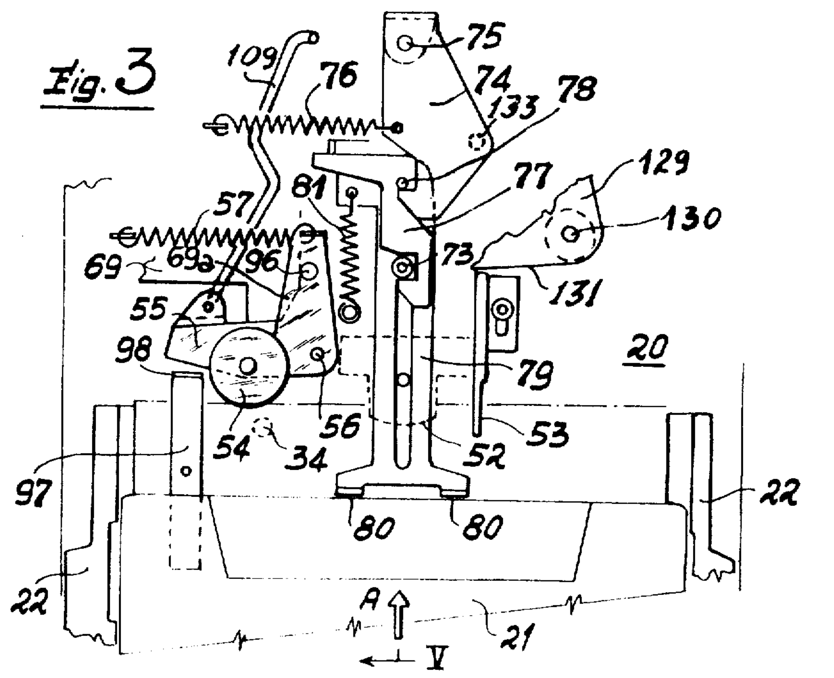
FIG. 3 is a plan view of the mechanism actuated by the pushing the cartridge in the deactivated device.
Figure 4:
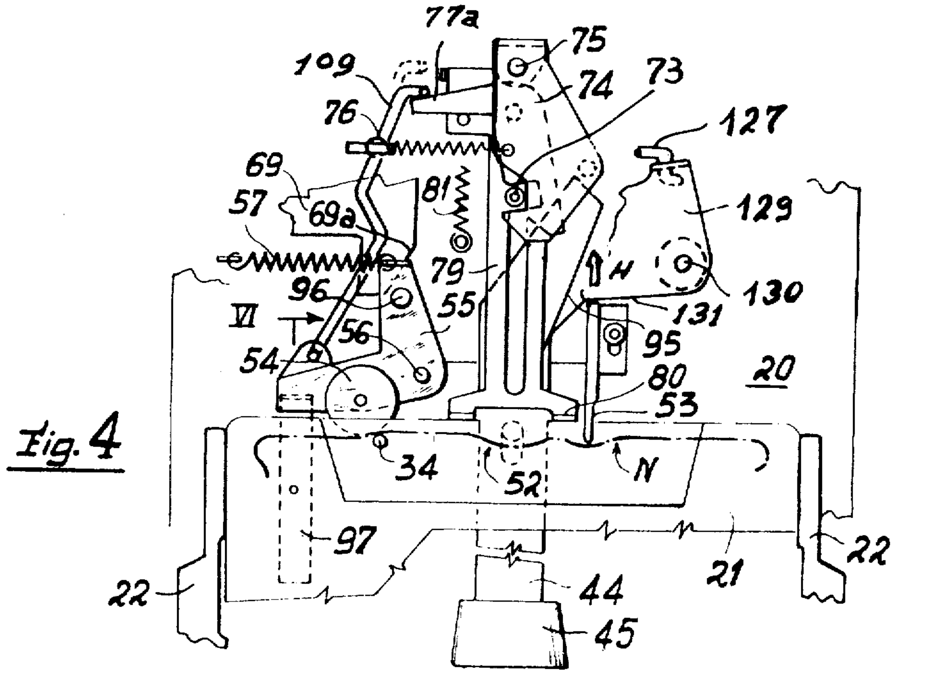
FIG. 4 os a similar view of same mechanism, upon activation of the device.
Figures 12, 13:
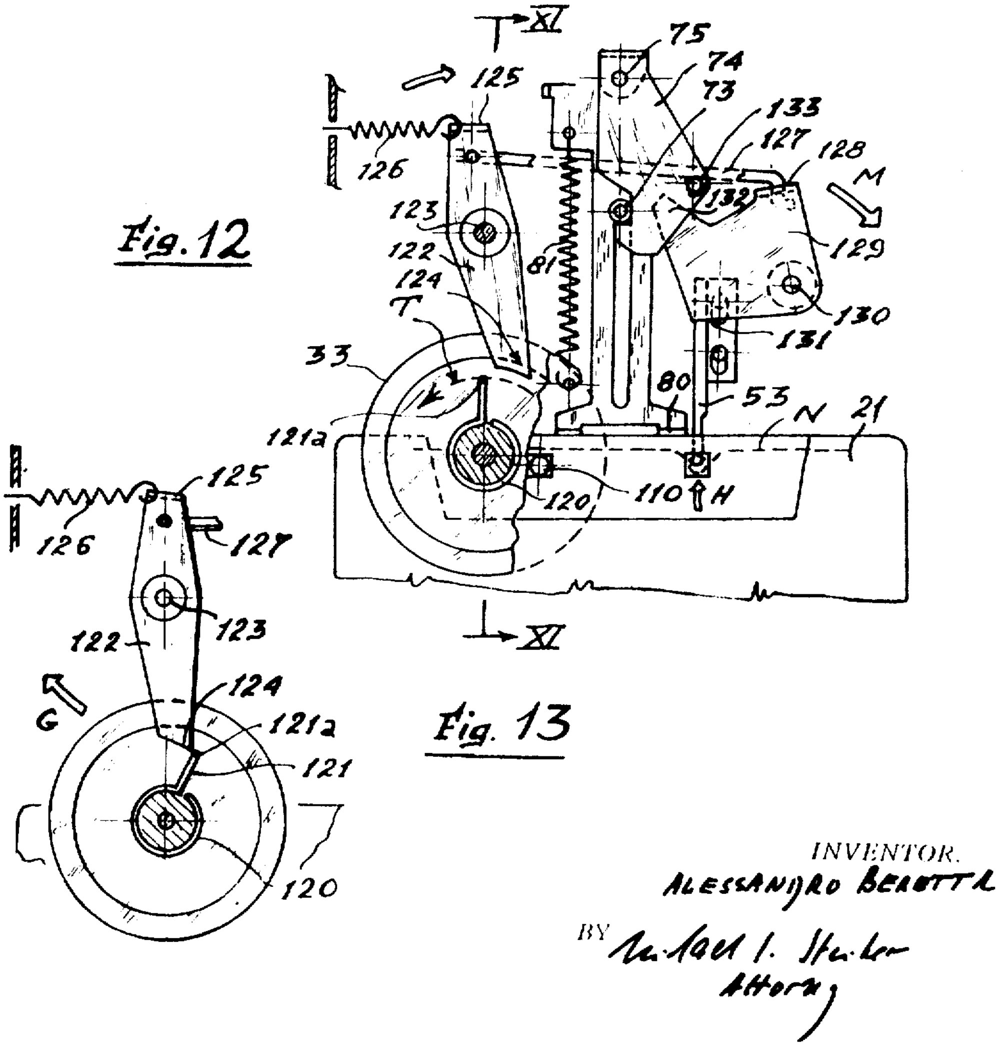
FIG. 12 is partly a plan view and partly a sectional view, taken in the plane indicated at XII—XII in FIG. 11, of said unlocking mechanism, during the regular service of the apparatus.
FIG. 13 shows a part of the above mechanism, when activated by sensing a complete unwinding of the tape from one reel.

When a cartridge such as 21 is manually inserted in the apparatus and urged in direction A, its longer side (which has the said cutouts formed therealong) abuts on upturned lugs 80 integral with an upper slide component 79, which has a latch pin 73 latched thereto. Said upper slide 79 is spring biased in direction opposite to A by a spring 81 (FIGS. 3, 4 and 12). The pin 73 has a downwardly depending portion, sliding through and along a groove provided in the stationary plate 20 and having its lower end secured to a lower slide component 69, as shown in particular in FIGS. 5 and 7.

Figures 5, 6, 7:
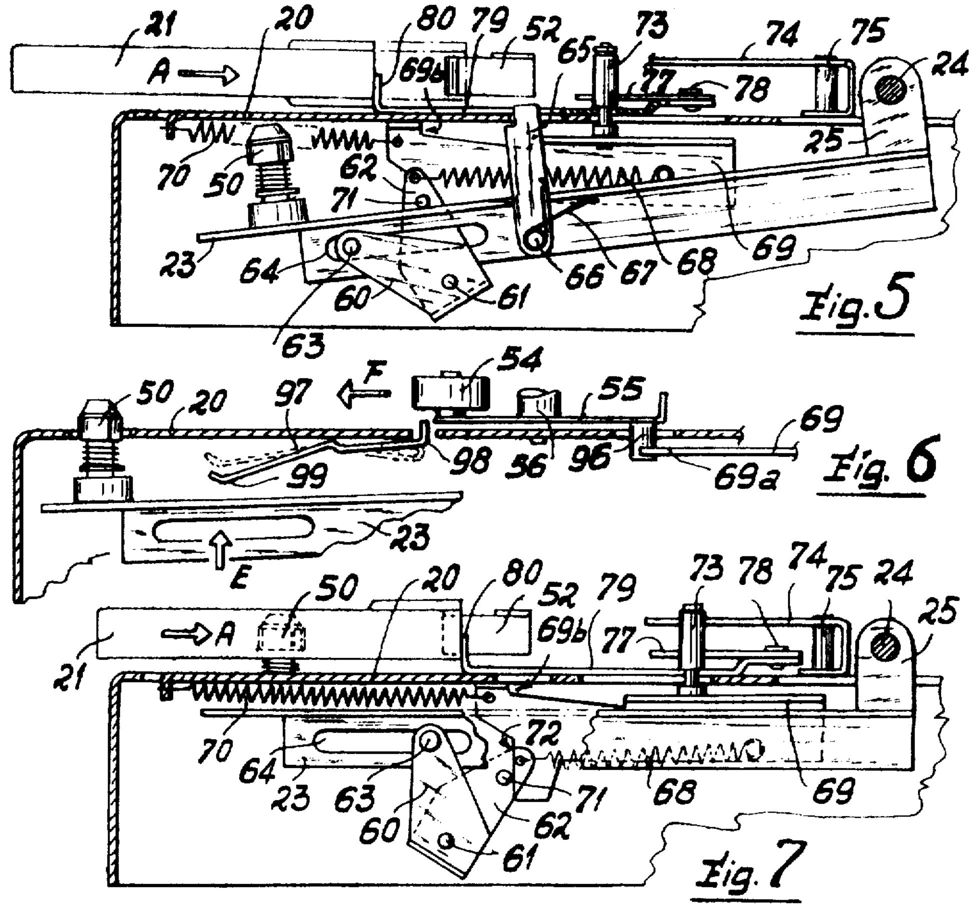
FIG. 5 is a longitudinal sectional view of the mechanism, taken in the plane generally indicated at V in FIG. 3.
FIG. 6 is a similar sectional view of a detail, taken in the plane indicated at VI in FIG. 4.
FIG. 7 is a view similar to that of FIG. 5, upon activation of the apparatus.

Such lower slide 69, when moved in direction A, performs a plurality of actions. It is spring biased in direction opposite to A by a spring 70 and has one end of another spring 68 secured thereto (FIG. 5). The opposite end of said spring 68 is secured to an arm 62 pivoted at 61 and having another arm 60 secured thereto for concurrent rotation therewith, and carrying a pin 63 slidably engaged in a slot 64 provided in a depending part of the movable plate 23. Further, the slide component 69 has an edge 72 positioned to urge, in direction opposite to A, on a pin 71 secured to said arm 62. Still further, the same lower slide component has an end portion 69b which, when said component is displaced in direction A, at the end of the stroke urges on a small lever 65 pivoted at 66 to the movable plate and having a notch adapted to engage the stationary plate 20, when the movable plate 23 is in its lowermost position shown in FIG. 5, and spring biased by a spring 67 in this position. Said lever 65 has not been shown in FIG. 7 to not conceal other significant components.

Additionally, the same slide component 69 provides for returning the said pinch roller 54 in its position spaced from the tape N and outside from the cartridge 21, when the device is being deactivated, as described below. The said component 69 has an edge portion 69*a* (FIG. 6 and, fragmentarily shown in phantom line in FIG. 3) shaped to form a camming surface and engaging a pin 96 secured to the L-shaped lever 55 which carries the said pinch roller. When said slide component 69 is moved in direction opposite to A, by its biasing spring 70, said camming part 69*a* acts on said pin 96, causing the said lever 55 to clockwise rotate until engagement with the said upturned end portion 98 of the oscillating lever 97, as above described with reference to FIGS. 3 and 6.

In the position of FIGS. 3 and 5, the movable plate 23 is locked by the small lever 65 in its inoperative lowermost position. As the cartridge 21 is manually urged in direction A, the upper and the lower slide components 79 and 69 are concurrently displaced, loading the springs 81, 70 and 68. When the part 69b abuts on the lever 65, such lever is clockwise turned about 66 and unlocks the movable plate 23 for upward swinging about pins 24. Such swinging is provided by the load applied to spring 68 which causes the arms 62 and 60 to clockwise rotate until the parts are carried in the position shown in FIGS. 4 and 7, where the movable plate 23 is locked in its uppermost position of FIG. 7, because the alignment of pins 61 and 63 are nearly perpendicular to the groove 64.

Such motions carry the drive capstan 34 and pins 50 and 51 in their engagement within the cartridge 21. It will be noted that the motion of said latter parts is not completely linear, but performed along an arc of a circle having its center in the axis of pins 24. Such arc has a relevant radius and a small angular amplitude and, therefore, such motion is so slightly cambered that proper fitting of said pins in the cartridge is not prejudiced.

At the end of the stroke of the said slide components, in direction A, the said pin 73 is engaged by a latch lever 74 pivoted at 75 on the stationary plate 20 (FIGS. 3, 4, 5, 7, 11 and 12), and therefore all said components are retained by said latch arm in the operative position of FIGS. 4 and 7. The latch arm 77, pivoted at 78 to the upper slide component 79, and through which the pin 73 and therefore the lower slide component 69 have been caused to move in direction A concurrently with the pushing of the cartridge into the apparatus, is disengaged by said pin 73 by a rod 109, pivotally connected to the L-shaped lever 55 (FIGS. 3 and 4) which urges on a brace 77*a* integral with said latch arm 77, when the pinch roller 54 is moved in its pressure engagement with the tape. Therefore, when the apparatus is activated, the one means which locks the various parts in the position shown in FIGS. 4 and 7 is the said latch lever 74.

During regular service of the apparatus, its deactivation is operator controlled by manually acting in direction A on the knob 45 of control lever 44, causing, by means of conventional camming parts, the counterclockwise rotation of latch lever 74 to free the pin 73. In such occurence, the previously loaded spring 70 returns the lower slide component 69 in direction opposite to A, and the edge 72 of such component, urging on pin 71 of arm 62, causes the arms 62 and 60 to counterclockwise rotate and then the movable plate 23 to be lowered until the arm 65 locks said plate in its lowermost position of FIG. 5. In the meantime, as the pins 110 (FIG. 10), 50 and 51 are disengaged from the cartridge, such cartridge is pushed out from the apparatus by the action of lugs 80 of the upper slide component 79, driven by the previously loaded spring 81 (FIG. 3).

The above described actions leading to complete deactivation of the apparatus are also automatically performed when the tape follower sensor 53 senses an increasing of the pull applied to the tape, said increasing occurring, as known, when the tape is completely unwound from one reel. It is evident that such sensor is urged, in direction H (FIGS. 4 and 12), by the increasing pull applied to the tape, with a very small force which cannot deal with the action of counterclockwise rotating of latch member 74,both because such latch lever 74 is spring biased by a spring 76 (FIGS. 3 and 4), for making sure the latch, and because the pin 73, to which the pretty relevant forces of springs 81 and 70 are applied, requires a relatively great force for being de-latched from said arm.

Figure 11:
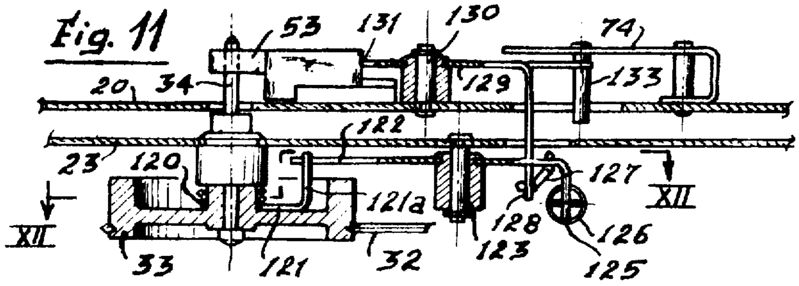
FIG. 11 is a sectional view, taken in the plane indicated at XI—XI in FIG. 12, of an automatic unlocking mechanism triggered by the tape sensor.

Such force is preferably provided by a mechanisms, such as shown in FIGS. 11, 12 and 13, which operates substantially according to the principles disclosed in my co-pending patent application Ser. No. 822,374, filed on May 7, 1969. Such mechanism makes use of the inertial force of rotating flywheel 33 for providing the automatic delatching, upon an action triggered by motion H of the sensor 53, when an greater pull on the tape N is sensed.

To the hub of said flywheel 33 a small arm 121 is resiliently secured by means of a coil spring 120, said arm having an upwardly bent end portion 121*a* ) which rotates along a circular path such as indicated by curved arrow T in FIG. 12. A two-armed lever 122, pivoted at 123 on the movable plate 23, has a pointed end portion 124 which, during the regular service of the apparatus (FIG. 12) is located near to but not interferring with said path T, and maintained in this position by a light spring 126, secured to the opposite end 125 of said lever.

To the same end portion 125 of the lever 122 a link 127 is pivoted. Said link 127 connects said lever 122 with a shaped member 129, to which said link is hinged at 128. The member 129 is pivotally supported at 130 to the stationary plate 20 and has an edge 131 positioned to be urged in direction H by said sensor 53, and a shaped part 132 which, upon a pretty ample rotation of said member 129 in direction M, about its pivot 130, abuts on and urges a pin 133 secured to said latch arm 74, causing the desired delatching counterclockwise rotation on said latter arm.

Now, when the sensor 53 senses the greater pull on the tape N, its motion in direction H causes a slight rotation M of the member 129. Such rotation is trasmitted by link 127 to the two-armed lever 122 which is concurrently slightly rotated in direction G, until its pointed end 124 reaches the path T of the end 121*a* of arm 121. The consequent action of said arm on said two-armed lever, as shown in FIG. 13, causes the said lever to further rotate in direction G and therefore the member 129 to further rotate in direction M, until the pin 133 is urged by the part 133, causing the desired disengagement of pin 73 from the latch arm 74, the force applied for performing said actions, triggered by the motion H of sensor 53, being provided by the inertial mass of flywheel 33.

I claim:

1. In a tape recorder for use with an apertured cartridge case enclosing a pair of reels and a magnetic tape wound therein and adapted to be pushed in one direction from an inoperative to an operative position into the recorder for engaging said reels with reel driving pins and said tape with a tape driving capstan, and a transducer head, a combination comprising a stationary plate; guide means on said stationary plate for guiding the cartridge case in said one direction from said inoperative to said operative position; a movable plate carrying said drive pins and said capstan and drive means for driving said drive pins and said capstan, said movable plate being connected to said stationary plate tiltable about an axis spaced from said cartridge case in the operative position of the latter and movable in direction of movement of said case from said operative to said inoperative position; means for moving said movable plate, upon moving said cartridge case to said operative position, from a first position wherein said drive pins and capstan are spaced from to a second position wherein said drive pins and capstan are respectively engaged with said reels and said tape, and vice versa, said moving means comprising a first slide member adapted to be engaged by said cartridge case during movement of the latter in said one direction so as to be moved in said direction, a first spring connected to said first slide member for biasing the latter in a direction opposite to said one direction, a second slide member connected to said first slide member for movement therewith, a second spring connected to said second slide member and acting on said movable plate for moving the latter from said first to said second position when said first slide member is moved by said cartridge case in said one direction, both of said springs being stressed during such movement; latch means to lock said slide members and said movable plate in position when said movable plate is moved to said second position; and means for unlocking said latch means to thereby return said movable plate to said first position and to push said cartridge case to its inoperative position by the action of said springs.

2. A combination as defined in claim 1, wherein said second spring is connected at one end to said second slide member and including lever means comprising two arms pivotally connected to said stationary plate, one of said arms being connected at one end to the other end of said second spring and the other arm being operatively connected to said movable plate, said lever means being arranged to lock said movable plate in said second position.

3. A combination as defined in claim 2, and including an elongated part fixed to said movable plate and formed with an elongated slot extending in said one direction, said lever means being pivotable about a fixed pivot axis and including a pin fixed to said other arm and projecting into said elongated slot, said pivot axis and said pin being arranged with respect to each other to be located in a plane normal to said slot when said movable plate is in said second position to lock the movable plate in this position.

4. A combination as defined in claim 1, and including locking means for locking said movable plate in said first position, and means on said second slide member for moving said locking means to an unlocking position when said slide members have nearly completed their movement caused by moving said cartridge case from said inoperative to said operative position.

5. A combination as defined in claim 4, wherein said locking means comprise a lever pivotally mounted on said movable plate and biasing means for normally urging one end of said lever into engagement with said stationary plate for preventing movement of said movable plate from said first to said second position.

6. A combination as defined in claim 1, wherein said moving means comprise a drive motor and transmission means between said drive motor, said driving pins and said capstan, said transmission means comprising flywheel means, and including tape tension sensing means movably mounted on said stationary plate and adapted to engage said tape when said cartridge case is in said operative position, said tape tension sensing means being moved from an inactive to an active position when the tension in said tape is increased by complete unwinding thereof from one of said reels, said unlocking means being connected to said latch means and said tape tension sensing means cooperating with said unlocking means for causing engagement of said unlocking means with said flywheel means upon movement of said tape tension sensing means to said active position to thus trigger unlocking of said latch means whereby the energy for this unlocking action is provided by the inertial mass of said flywheel means.

7. A combination as defined in claim 1, and including a pinch roller, a lever pivotably mounted on said stationary plate and supporting said pinch roller movable between a first position spaced from said tape and a second position engaging said tape opposite said capstan, when said cartridge case is in its operative position, biasing means connected to said lever for biasing said lever to a position in which said pinch roller is in said second position, means to lock said lever in a position in which said pinch roller is in said first position, and means on said movable plate and cooperating with said lock means of said lever to release said lever so that the latter may move under the action of said biasing means to thereby move said pinch roller to said second position when said movable plate is moved to said second position.

* * * * *